United States Patent
Shulman et al.

(10) Patent No.: US 8,181,246 B2
(45) Date of Patent: May 15, 2012

(54) SYSTEM AND METHOD FOR PREVENTING WEB FRAUDS COMMITTED USING CLIENT-SCRIPTING ATTACKS

(75) Inventors: Amichai Shulman, Tel Aviv (IL); Guy Karlebach, Tel Aviv (IL)

(73) Assignee: Imperva, Inc., Redwood Shores, CA (US)

( * ) Notice: Subject to any disclaimer, the term of this patent is extended or adjusted under 35 U.S.C. 154(b) by 804 days.

(21) Appl. No.: 12/143,168

(22) Filed: Jun. 20, 2008

(65) Prior Publication Data

US 2008/0320567 A1   Dec. 25, 2008

Related U.S. Application Data

(60) Provisional application No. 60/945,123, filed on Jun. 20, 2007.

(51) Int. Cl.
*G06F 11/00* (2006.01)
*G06F 15/16* (2006.01)
(52) U.S. Cl. .............. 726/22; 726/9; 709/245
(58) Field of Classification Search .......... 709/245; 726/9, 22
See application file for complete search history.

(56) References Cited

U.S. PATENT DOCUMENTS

| | | |
|---|---|---|
| 2005/0021791 A1 | 1/2005 | Sakiyama et al. |
| 2006/0101334 A1 | 5/2006 | Liao et al. |
| 2007/0101258 A1 | 5/2007 | Xu et al. |
| 2007/0107057 A1 | 5/2007 | Chander et al. |
| 2007/0113282 A1 | 5/2007 | Ross |
| 2008/0083032 A1 | 4/2008 | Yamaoka |
| 2008/0115201 A1 | 5/2008 | Sturms et al. |
| 2008/0263650 A1* | 10/2008 | Kerschbaum ............ 726/9 |
| 2008/0281983 A1* | 11/2008 | Cooley et al. .......... 709/245 |

OTHER PUBLICATIONS

Brian Chess, et al.; "Javascript Hacking," Fortify Software white paper, Mar. 2007.

* cited by examiner

*Primary Examiner* — Philip Lee
(74) *Attorney, Agent, or Firm* — Blakely Sokoloff Taylor & Zafman, LLP

(57) ABSTRACT

A method for detecting and blocking Javascript hijacking attacks, comprising checking if an incoming request belongs to a valid session established between a client and a trusted server. When said incoming request does belong to a valid session, it is checked if a Referer header of said incoming request includes a valid domain name. The incoming request is marked as suspicious, when said incoming request does not include a valid domain name. It is checked if a respective response of said suspicious incoming request includes a script code. A preventive action responsive to a user input is taken when said respective response includes a script code.

8 Claims, 4 Drawing Sheets

SYSTEM AND METHOD FOR PREVENTING WEB FRAUDS COMMITTED USING CLIENT-SCRIPTING ATTACKS

CROSS REFERENCE TO RELATED APPLICATIONS

This application claims benefit from U.S. Provisional Application No. 60/945,123 filed on Jun. 20, 2007, the contents of which are herein incorporated by reference.

TECHNICAL FIELD

The disclosed teachings relate generally to protecting web-applications and clients using web-application from scripting attacks.

BACKGROUND

The accessibility and convenience of the Internet rapidly changed the way people access information. The World Wide Web ("WWW"), usually referred to as "the Web", is the most popular means for retrieving information available through the Internet. The Web gives users access to a vast number of resources from locations around the world. In addition, the Web allows enterprises and organizations to expose their business information and functionality on the Web through software applications, usually referred to as "Web applications".

A significant problem facing enterprises is the vulnerability of Web applications, databases and Web sites to attacks from malicious, irresponsible, or criminally minded individuals or organizations. As many web applications today utilize command scripts to perform a variety of tasks the number of client-side script attacks in web-applications has been rapidly increasing. A command script, or script code, typically is a computer file containing a sequence of text commands and arguments that conform to a particular scripting language. Examples for two recent harmful client-side script attacks include JavaScript (JS) hijacking and cross-site request forgery (CSRF).

The AJAX technology allows asynchronous and on-demand loading of dynamically generated content. For example, a piece of dynamically generated HTML content or XML document can be loaded in response to a user action. This technology, on one hand, can improve the responsiveness of web applications and enhance the end user experience, and on the other hand, a malicious web site can easily hijack pages from other web sites.

FIG. 1 provides an example for a JS hijacking attack in which an attacker server 110 retrieves confidential information from a trusted server 120 through a client 130. The trusted server 120 runs a web-application compliant with the AJAX technology. The client 130 and server 120 use Javascript to communicate with each other. For example, to get credit card information from a URL in the trusted server 120, the client 130 executes a function (e.g., XMLHttpRequest) that queries server 120 using a HTTP GET request. The server 120 responds with the credit card information in the form of Javascript code. The Javascript code contains a call to a client side function, which upon its execution presents the credit card information. The HTTP GET requests are responded to only during a valid session between the trusted server 120 and client 130.

The attacker creates a web page that contains a script element with a source (src) pointing to the URL that includes the credit card information. In addition, the attacker overrides the function that presents the credit card information with a new function that sends the credit card details to the attacker server 110. In order to get the credit card information, the attacker needs to lure web users to visit the attacker's web page (e.g., using spam emails). When a user follows the link to the attacker's site in server 110 and there is a valid session with the trusted server 120, the client 130 sends the information from the trusted server 120 to the attacker server 110 (using the overridden display function).

CSRF is another type of security vulnerability detected in web-based applications. Such vulnerability is generated by loading into a client's browser, e.g., client 130, HTML elements or Javascript code that generate an authenticated HTTP request to a target site in the trusted server 120. The CSRF allows modifying information stored by the trusted server 120.

Prior art solutions for preventing scripting attacks have not been sufficiently effective. Such solutions include changing the functionality of web-applications. In most cases this is a very costly task that also cannot be applied to any type of software (e.g., third party modules). Other solutions include static analysis of a script programs or validating the results of a script program. These solutions are disclosed in US patent applications 2007/0113282 and 2007/0107057, each of which is incorporated herein by reference for its useful background descriptions of the state of the art heretofore.

In the view of the shortcoming of prior art approaches it would be advantageous to provide an efficient solution for preventing scripting attacks of web applications.

SUMMARY

To realize some of the advantages noted above, there is provided a method for detecting and blocking Javascript hijacking attacks, comprising checking if an incoming request belongs to a valid session established between a client and a trusted server. When said incoming request does belong to a valid session, it is checked if a Referer header of said incoming request includes a valid domain name. The incoming request is marked as suspicious, when said incoming request does not include a valid domain name. It is checked if a respective response of said suspicious incoming request includes a script code. A preventive action responsive to a user input is taken when said respective response includes a script code.

In a specific enhancement, the preventive action is selected from a group consisting of: generating an alert, blocking said incoming request and blocking said respective response.

In another specific enhancement, user input is sought for by one of: displaying a request for user authorization and displaying an alert in a pop-up window.

More specifically, the method further comprises relaying said incoming request to said trusted server by at least one of: said incoming request not belonging to a valid session and said incoming request includes a valid domain name.

More specifically, the valid domain name in the Referer header field is a domain name that belongs to a protected web site.

More specifically, generating the alert further comprises inserting a special purpose script code in a response sent to the client, wherein the special purpose script code allows a user to block the response from being executed over the client.

Another aspect of the disclosed teachings is a method for preventing cross-site request forgery (CSRF) attacks, comprising initializing a security monitor to be executed over a web browser of a client, when a login request is sent from said client to a protected web site hosted in a trusted server. It is checked if an incoming request subsequent to said login request belongs to a valid session established between said client and said trusted server. When said incoming request does belong to said valid session, it is checked if the Referer header of said incoming request includes a valid domain name. The security monitor is caused to generate an alert indicating a suspicious request.

More specifically, the method comprises relaying said incoming request to said trusted server as at least one of: said incoming request does not belong to a valid session, and said incoming request includes a valid domain name in it's Referer header field.

More specifically, checking if said incoming request includes the valid domain name further comprises checking if said header includes a Referrer field; and checking if said Referrer field includes a uniform resource identifier (URI) of a protected web site, wherein said protected web-site is hosted on said trusted server.

More specifically, said alert enables a user to either allow or reject said suspicious request.

Another aspect of the disclosed teachings is a system comprising a first unit for capturing hyper text transfer protocol (HTTP) requests sent from a client to a trusted server and for capturing HTTP responses sent from said trusted server to said client. A second unit analyzes said HTTP requests and said HTTP responses to detect suspicious requests. A third unit alerts users of potential attacks.

More specifically, said potential attacks comprise at least one of: Javascript hijacking, cross-site request forgery (CSRF).

DETAILED DESCRIPTION

In order to improve the protection of web-applications a system and method to prevent web fraud committed using scripting attacks is disclosed. The detection is based on analyzing Hyper Text Transfer Protocol (HTTP) traffic that flows from a client to a trusted server. The method further allows the detection of attacker servers which commit the attacks. Preferably it prevents and blocks scripting attacks including, but not limited to, JavaScript hijacking and cross-site request forgery (CSRF).

Figure 1:
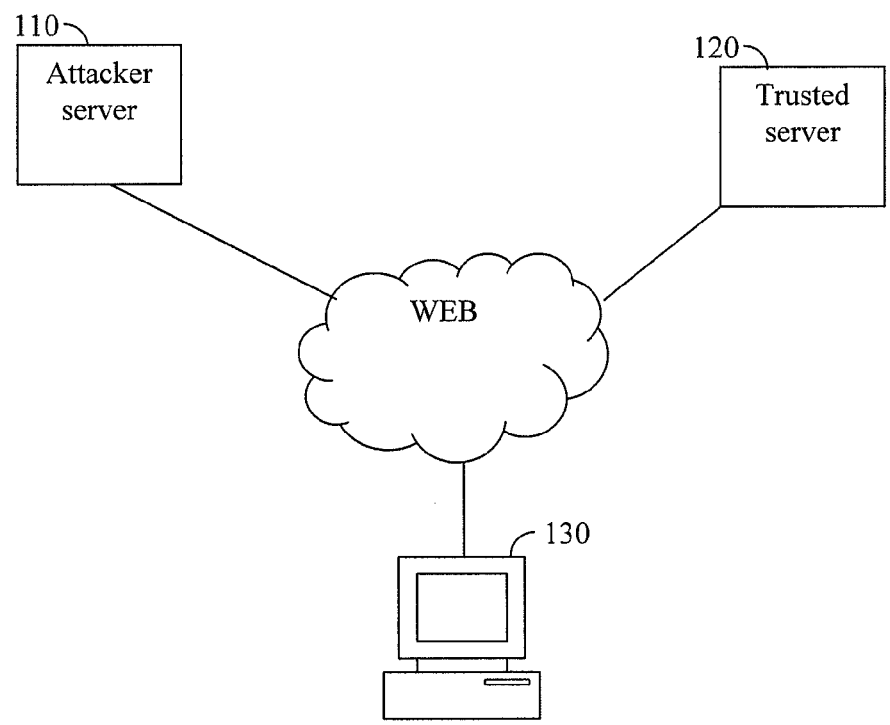
FIG. 1—is a diagram of a network system used to describe the JS hijacking attack FIG. 2—is a diagram of an application level security system disclosed in accordance with certain embodiments of the disclosed teachings FIG. 3—is a flowchart describing the method for preventing JS hijacking attacks in accordance with certain embodiments of the disclosed teachings FIG. 4—is a flowchart describing the method for preventing CSRF attacks in accordance with an embodiment of the disclosed teachings
Figure 2:
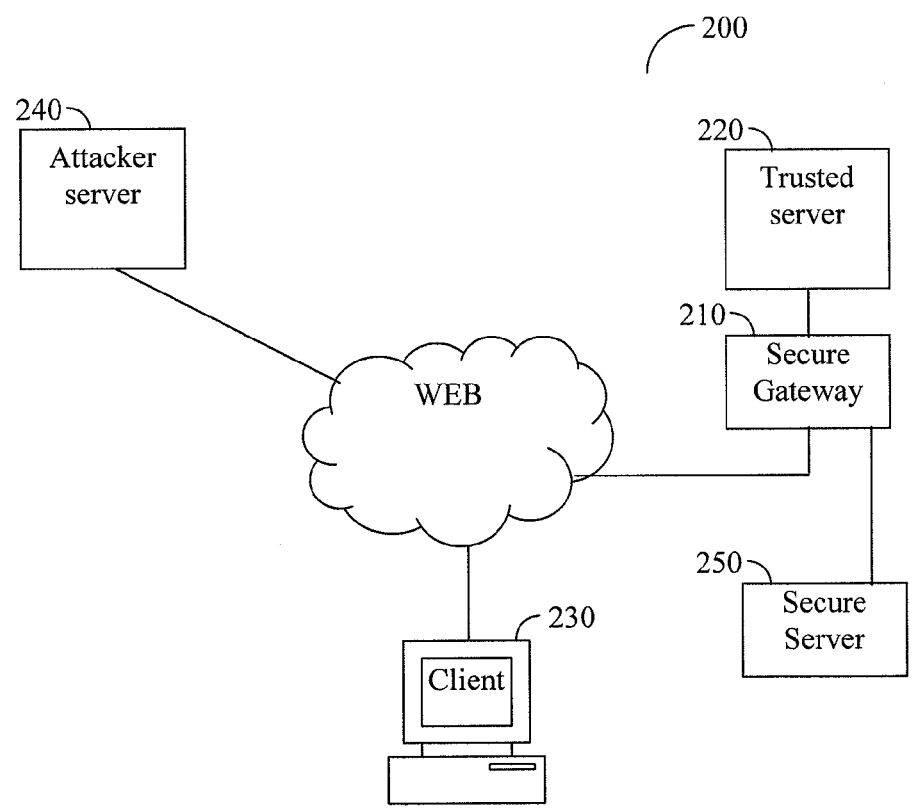

FIG. 2 shows an exemplary diagram of an application level security system 200 that discloses some embodiments of the present invention. Security system 200 is capable of detecting and blocking at least JS hijacking and CSRF attacks by analyzing HTTP traffic. The security system 200 includes a secure gateway 210 coupled between a trust server 220 and a client 230. An attacker server 240 attacks the trusted server 220 through a client 230. The servers 220 and 240 as well as client 230 are connected to the Internet. The trusted server 220 hosts the web-site of the application to be protected in a domain different than the domain in which the attacker server 240 hosts the attacker's web page.

In order to mitigate JS hijacking attacks, the secure gateway 210 analyzes HTTP requests to detect properties related to such attacks. Specifically, the secure gateway 210 looks for a Referer request-header field in the request, and if such field does not exist, the request is potentially a malicious request.

It is well-known that a Referer, or HTTP Referer, identifies, from the point of view of an Internet webpage or resource, the address of the webpage (commonly the URL or the more generic URI or the updated IRI) of the resource which links to it. By checking the Referer, the new page can see where the request came from. Referer logging is used to allow websites and web servers to identify where people are visiting them from, for promotional or security purposes.

Typically, the malicious request is generated by a link from an HTML <script> element. As a result, the domain specified in the Referer request-header field is different than the domain of the target application hosted on trusted server 220. This is not a typical case if the request belongs to a valid authenticated session. Moreover, to alert on a potential attack the secure gateway 210 checks as whether the content type of the response sent from the trusted server 220 is a script (e.g., Javascript code). When the secure gateway 210 detects a potentially malicious request an alert is generated allowing the user to block the attack. In accordance with one embodiment, the secure gateway 210 produces the alert by adding a special purpose piece of Javascript code to a response sent from the trusted server 220 to a client 230.

To detect CSRF attacks, a security monitor (not shown) is instantiated using, for example, special purpose Javascript code in the client's 230 browser. The monitor forms a link between the secure gateway 210 and the client 230. The secure gateway 210 intercepts malicious requests and sends them to the security monitor for evaluation. The security monitor prompts the user to authorize the malicious request. While the request is being evaluated, the secure gateway 210 repeatedly redirects the original request to the client 230, until the decision whether or not to authorize the request is returned by the security monitor to the secure gateway 210. A request is relayed to the trusted server 220 only if it was authorized; otherwise, the request is rejected.

To maintain an active and optimized connection between the secure gateway 210 and the monitor a modified version of the transmission control protocol (TCP) is utilized. Specifically, the TCP protocol used by the gateway 210 includes the following changes: data transmission is repeated at constant time intervals, without coordinating re-transmission of data. The window size at the server side (i.e., gateway 210) is constant for all TCP connections and data transfer is initiated by the secure gateway 210. The secure gateway 210 does not send keep-alive requests and the connection is terminated if all of the client's HTTP sessions are terminated. A congestion control mechanism is not employed in the modified version of TCP.

In accordance with the disclosed teachings, the system 200 gathers data on rejected HTTP requests in order to identify fraud attempts. Such information can be used by security administrators to notify site owners that fraud attempts were committed against their Web sites. In one embodiment, the information about fraud attempts is provided by the secure gateway 210. In accordance with another embodiment, data gathered about rejected HTTP requests is sent to a secure server 250 which processes the data in order to detect fraud attempts. The secure server 250 then generates a report that may include information about fraud attempts and security bugs. The secure server 250 is coupled to the secure gateway 210 using a dedicated link.

Figure 3:
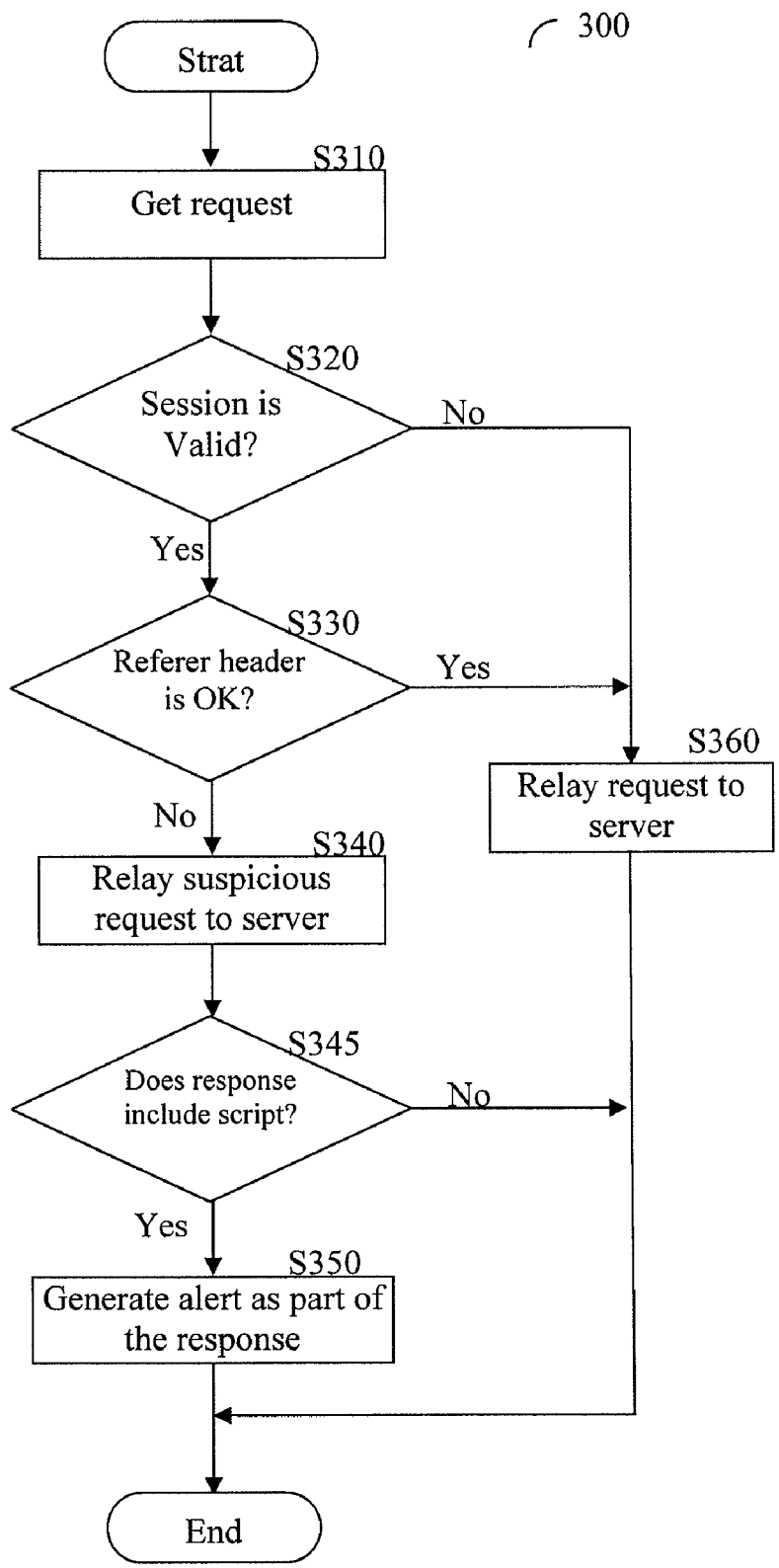

FIG. 3 shows an exemplary and non-limiting flowchart 300 describing the method for handling JS hijacking attacks in accordance with certain embodiments of the disclosed teachings. At S310, an HTTP request, sent from a client, is received at the secure gateway 210. At S320, the secure gateway determines if the request belongs to a valid session, and if so execution continues with S330; otherwise, execution proceeds to S360 where the request is sent to the trusted server, and then execution ends. At S330 another check is made to determine if the Referer request-header field is part of the request and if the domain included in the Referer request-header field is the same domain as that of the protected web-site. If so, execution proceeds to S360; otherwise, execution continues with S340. The HTTP specification determines that a request generated by a source that does not have its own uniform resource identifier (URI) must not contain a Referer request-header field. If the Referer request-header field is not included in the request, then the request may be malicious or the header was removed by the client's browser to protect user privacy. At S340 the request is marked as "suspicious" and relayed to the trusted server for its execution. At S345, a check is performed to determine if a response (associated with the suspicious request) contains a script code. If not, execution ends; otherwise, at S350, an alert is generated by adding special purpose script code to the response sent to client 230. The added script code does not invoke any function that can be overridden by the attacker server. The alert code runs on the client's browser and notifies the user about the potential attack. The user may decide to allow or deny further processing of the content of the original response in the client's browser. The secure gateway may collect data on the rejected request/response.

Figure 4:
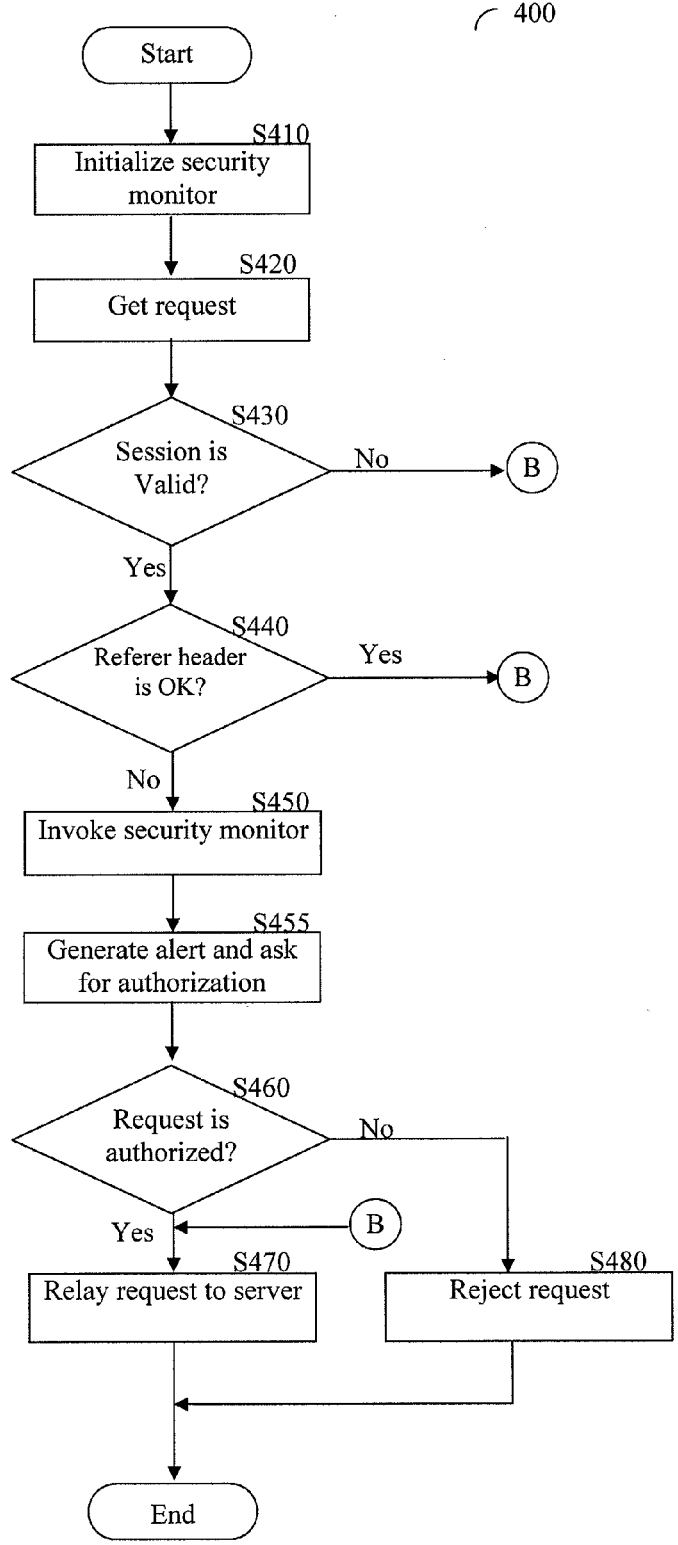

FIG. 4 shows a non-limiting and exemplary flowchart 400 for mitigating CSRF attacks in accordance with certain embodiments of the disclosed teachings. At S410, once a user logs into the protected web-site, the secure gateway initializes the security monitor to run on client's browser. Typically, the security monitor is initialized at the first request sent from a client during a new established session. Once initialized, the monitor sends a request to the security gateway and waits for its response. At S420, a request sent from a client to a trusted server is intercepted by the secure gateway. At S430, the secure gateway determines if the request belongs to a valid session, and if so execution continues with S440; otherwise execution continues with S470 where the request is relayed to the trusted server, and thereafter execution terminates. At S440 another check is made to determine if the Referer request-header field is part of the request and if the domain included in the request-header field is the same as that of the protected web-site. If S440 results with a Yes answer execution proceeds to S470; otherwise, the request is potentially a malicious request and execution continues with S450. At S450 the security monitor is invoked through a response sent from the security gateway. Consequently, at S455 the monitor alerts the user on the potential request and prompts the user to authorize the request. The alert may be displayed, for example, in pop-up window. At S460 it is checked whether the user authorized or declined the request. If the request is authorized, then at S470, upon the security monitor instruction, the gateway relays the request to the trusted server; otherwise, at S480 the request is rejected by the secure gateway which may further collect data on the rejected request. It should be noted that the request may be automatically authorized by the security monitor based on user's consent or pre-configuration of the security monitor (e.g., allow all requests from a certain sites). It should be further noted that while waiting for the user's authorization the secure gateway repeatedly sends redirect requests to the client requesting to retransmit the original request. This is performed as the secure gateway cannot keep and hold requests while maintaining live connection with the client.

The system and methods described herein can be implemented by software, hardware, firmware, or any combination thereof. Inventions may be further implemented as a sequence of instructions embedded into a tangible computer readable medium, such that when executed on an appropriate device, for example a computer, the sequence of executed instructions results in the benefits of the inventions disclosed hereinabove.

What is claimed is:

1. A method for detecting and blocking Javascript hijacking attacks, comprising:
checking, by a secure gateway connected to at least a trusted server and communicatively coupled to a client, if an incoming request does not belong to a valid session established between a client and a trusted server and transferring the incoming request to the trusted server in response to the incoming request not belonging to the valid session thereby completing the method; otherwise, when said incoming request does belong to the valid session, checking if a Referer header field of said incoming request includes a domain name that is of a protected web-site hosted by the trusted server;
marking said incoming request as suspicious, when said incoming request does not include the domain name;
transferring the suspicious incoming request to the trusted server;
checking if a respective response of said suspicious incoming request includes a script code; and
taking a preventive action responsive to a user input when said respective response includes the script code by skipping processing of the respective response based on the user input, such that a hijacking attack to gain access to sensitive information conveyed to the client is prevented.

2. The method of claim 1, wherein said preventive action is selected from a group consisting of: generating an alert, blocking said incoming request and blocking said respective response.

3. The method of claim 1, wherein said user input is sought for by one of: displaying a request for user authorization and displaying an alert in a pop-up window.

4. The method of claim 2, wherein generating the alert further comprises:
inserting a special purpose script code in a response sent to the client, wherein the special purpose script code allows a user to block the response from being executed over the client.

5. A non-transitory computer-readable medium having stored thereon computer executable code for detecting and blocking Javascript hijacking attacks, the computer executable code comprising:
checking, by a secure gateway connected to at least a trusted server and communicatively coupled to a client, if an incoming request does not belong to a valid session established between a client and a trusted server and transferring the incoming request to the trusted server in response to the incoming request not belonging to the valid session thereby completing the method; otherwise, when said incoming request does belong to the valid session, checking if a Referer header field of said incoming request includes a domain name that is of a protected web-site hosted by the trusted server;

marking said incoming request as suspicious, when said incoming request does not include the domain name;

transferring the suspicious incoming request to the trusted server;

checking if a respective response of said suspicious incoming request includes a script code; and taking preventive action responsive to a user input when said respective response includes the script code by skipping processing of the respective response based on the user input, such that a hijacking attack to gain access to sensitive information conveyed to the client is prevented.

6. The computer executable code of claim 5, wherein said preventive action is selected from a group consisting of: generating an alert, blocking said incoming request and blocking said respective response.

7. The computer executable code of claim 5, wherein said user input is sought for by one of: displaying a request for user authorization and displaying an alert in a pop-up window.

8. The computer executable code of claim 6, wherein generating said alert further comprises:

inserting a special purpose script code in a response sent to said client, wherein said special purpose script code allows a user to block said respective response from being executed over said client.

* * * * *